United States Patent [19]

Hodgson

[11] Patent Number: 4,874,607
[45] Date of Patent: Oct. 17, 1989

[54] SLOW RELEASE BERLEY

[76] Inventor: Peter C. Hodgson, 27 Eighth Street, Weston, New South Wales 2326, Australia

[21] Appl. No.: 860,075

[22] Filed: May 6, 1986

[30] Foreign Application Priority Data

May 8, 1985 [AU] Australia .............................. PH0470
Nov. 19, 1985 [AU] Australia .............................. PH3474

[51] Int. Cl.$^4$ ............................................. A01N 25/00
[52] U.S. Cl. ......................................... 424/84; 426/1; 426/62; 424/404
[58] Field of Search ........................ 426/1, 62; 424/84

[56] References Cited

U.S. PATENT DOCUMENTS 3,892,866  7/1975  Kanemitsu ............................ 426/62
3,993,746 11/1976  Beigler et al. ........................ 424/84
4,053,646 10/1977  Takesugi ................................ 426/1

FOREIGN PATENT DOCUMENTS 341775  1/1931  United Kingdom .................... 426/1

Primary Examiner—Joseph L. Schofer
Assistant Examiner—Peter F. Kulkosky
Attorney, Agent, or Firm—Ladas & Parry

[57] ABSTRACT

A slow release berley composition and a process for preparing a slow release berley composition are disclosed. The slow release berley composition includes a mixture of from about 10% to about 35% by weight flour, from about 30% to about 70% by weight bran, from about 5% to about 40% by weight water and from a trace to about 14% by weight of one or more water soluble alkali metal or alkaline earth metal salts or combinations thereof.

The process of the invention is for preparing a slow release berley composition which includes a mixture of from about 10% to about 35% by weight flour, from about 30% to about 70% by weight bran, from about 5% to about 40% by weight water, from a trace to about 14% by weight of one or more water soluble alkali metal or alkaline earth metal salts or combinations thereof and from a trace, to about 20% by weight fish oil. The process includes a first step of forming a bran/fish oil mixture by mixing the bran with the fish oil and a second step of mixing the flour, the water and the alkali metal or alkaline earth metal salt or combinations thereof with the bran/fish oil mixture to form the composition.

43 Claims, No Drawings

SLOW RELEASE BERLEY

This invention relates to a slow release berley composition.

Berley typically consists of compressed blocks of minced fish solids which are usually preserved by freezing and thus have to be used within a relatively short period of time after defrosting. In practice, mincing machinery presently used does not reduce the fish solids to a fine mesh and usually the resultant berley contains lumps of fish meat which has a tendency to sink rapicly minimizing the berley's effectiveness for attracting and holding fish. The lumps of fish meat also satiate fish which decreases the probability that they will take a bait.

It is an object of this invention to provide a slow release berley composition which ameliorates the above disadvantages. Another object is to provide a process for preparing a slow release berley composition.

In a first embodiment this invention provides a slow release berley composition including a mixture of from about 10% to about 35% by weight flour, from about 30% to about 70% by weight bran, from about 5% to about 40% by weight water and from a trace to about 14% by weight of one or more water soluble alkali metal or alkaline earth metal salts or combinations thereof.

In a second embodiment this invention provides a process for preparing a slow release berley composition including a mixture of from about 10% to about 35% by weight flour, from about 30% to about 70% by weight bran, from about 5% to about 40% by weight water, from a trace to about 14% by weight of one or more water soluble alkali metal or alkaline earth metal salts or combinations thereof and from a trace, to about 20% by weight fish oil which process includes a first step of forming a bran/fish oil mixture by mixing the bran with the fish oil and a second step of mixing the flour, the water and the alkali metal or alkaline earth metal salt or combinations thereof with the bran/fish oil mixture to form the composition.

It is preferred that the compressed berley composition is dried to a total water content of about 5% to 25% by weight and more preferably about 15% to about 24% by weight.

The composition of the invention optionally includes from a trace to about 20% by weight fish solids with at least about 80% by weight passing through a 2.83 mm screen. More preferably the composition includes from a trace to about 11% by weight fish solids which have been dried to less than about 12% by weight water and wherein at least about 80% by weight of the fish solids pass through a 750 micron screen.

The composition of the invention can include from a trace to about 20% by weight more preferably from a trace to 5% by weight fish oil. Typical fish oils such as tuna, pilchard, whale, seal oil or any mixture thereof are particularly suitable.

Tuna oil or pilchard oil or mixtures thereof is/are typically used by first mixing with the cereal bran so that in use the area of the oil/water interface is large. This absorption tends to decrease the rate at which the oil is separated from the other components of the berley composition when they are released by the action of water.

The flour can be coarse or fine mesh or a mixture thereof white or wholemeal flour preferably selected from wheat, rye, corn, rice, millet, sorghum, maize, barley or oat flour or any mixture thereof or flour of other like grain or mixture thereof. Preferably high protein wheat flour (about 10–16% by weight protein at about 10–14% by weight moisture level) is used.

The bran can be coarse or fine or a mixture thereof of any cereal bran including wheat, rye, corn, rice, millet, sorghum, maize, barley or oat bran or any mixture thereof or bran of other like grain or mixture thereof. A 50:50 mixture of coarse:fine wheat which is present in an amount from about 38% to 65% by weight is especially preferred.

Preferably sodium chloride is used as the alkali metal salt although other salts such as potassium chloride, lithium chloride, cesium chloride, sodium bromide, potassium bromide, lithium bromide, cesium bromide, sodium iodide, potassium iodide, lithium iodide, cesium iodine, sodium sulphate, sodium nitrate and other like salts or mixtures thereof can be used. Most preferably sodium chloride is present in an amount of from about 3% to about 14% by weight.

Fine mesh flour and fine mesh cereal bran are also typically used in the composition in addition to coarse flour and bran and to the fine mesh dried fish waste solids. As a result fine particles are released when a compressed berley composition is placed in water. These fine particles have a slow settling velocity, typically less than 1 meter per 300 seconds in still water which results in an effective berley gradient from the slow release berley composition.

An advantage of the slow settling rate is that fish are attracted to the near vicinity of the berley due to the higher concentration of released particles and it has been observed in practice that they remain in the close vicinity until the complete decomposition of the berley which is about four hours. Other forms of berley which are currently used in practice are typically released in pulse form which although stimulating the feeding of fish do not necessarily attract them for a suitably long time at a fixed location.

The flour in the slow release berley composition acts as a binder for the other particles in the berley. Thus the decomposition of the berley has been found in practice to be proportional to the flour/bran ratio. It has also been found that the brine/total solids ratio affects the decomposition time of the berley. The higher the brine/total solids ratio the faster the decomposition rate. It is thought that the sodium chloride modifies the elastic properties of the flour and bran and enables the gluten in the flour to break up in a controlled matter. In addition to sodium chloride, vegetable gelling agents may also be used; e.g. modified grain starches.

The sodium chloride also preserves the berley composition. Additional preservatives such as sodium nitrite and sodium benzoate can be incorporated into the berley composition to inhibit bacterial and fungal action. Colouring agents such as edible dyes may optionally be added to the berley composition for identification purposes.

Preferably the composition of the invention is compressed, e.g. by pressure moulding, to form a compressed mass in the form of a selected shape.

A sausage shape is a particularly preferred selected shape. The selected shape is then preferably dried (e.g. by heating in an oven) to reduce the total water of the compressed mass to about 15% to about 24% by weight.

A combination of a selected shape disposed in a water-permeable container such as a Sarlon netting bag or an extruded plastic or polyethylene net bag, is a preferred form of the invention.

This combination is an independent berley system which when placed in water breaks down releasing a constant stream of particles for up to four hours. Its use does not require any preparation and there is no mess associated with its application. The berley composition is totally biodegradable, does not require refrigeration and has an effective shelf life of eight weeks. The fine particles released from the berley do not tend to satiate fish since they have to swim harder to gather the fine particles released from the berley and this tends to stimulate their appetite.

The above combination is typically stored in a non porous bag. A thick polyethylene bag having a tropical moisture vapour transfer rate (M.V.T.R.) rating of less than 6 $gm^{-2}$ $day^{-1}$ moisture transfer under a gradient of 95% R.H. at 25° C. is especially suitable.

Preferably an antifungal, antibacterial, fumigant or any mixture thereof is added to the bag just prior to packing the berley and sealing. Paraformaldehyde has been found to be particularly effective fumigant for preventing mould formation and thereby increasing shelf life. Antifungals and/or antibacterials such as heavy metal salts, carbamates, organo sulphur compounds or halogenated hydrocarbons or other like substances or combinations thereof are also suitable. However, paraformaldehyde is preferred since:

(a) It breaks down to liberate formaldehyde, an antifungal and fumigant the rate of breakdown increasing as the temperature increases. This is particularly desirable since as temperature increases the amount of moisture liberated from the berley increases leading to more favourable conditions (in the absence of paraformaldehyde) for mould growth in the immediate vicinity of the berley (b) Paraformaldehyde is preferable to heavy metal salts, carbamates, organo sulphur compounds or halogenated hydrocarbons because it is less toxic to fish and it is rapidly biodegraded and thus quickly removed from the environment.

Methods of attracting fish by placing an effective fish attracting amount of a composition, compressed mass or combination of the invention in a body of water having fish are included within the scope of this invention.

Also included are a slow release berley composition or a compressed mass when prepared by a process of the invention.

Preferred embodiments of this invention are described in the following examples.

EXAMPLE 1

A berley composition was prepared consisting of:
54% Cereal brans
15% High protein wheat (13.3 to 14% total protein calculated at 13% moisture level)
21% Brine solution
6.7% Dried fish waste powder (80% passing through a 750 micron sieve)
3.3% Fish oils. (Tuna oil or pilchard oil or a mixture thereof)
(%—by weight)

The fish oils were mixed with the cereal brans and then the other ingredients were added in the above proportions. After mixing sausage-shaped berley was manufactured by pressure moulding. The internals of the mould used was coated with teflon or ultra-high density polyethylene to minimise friction between the mould and the mixture.

The rate of release of the sausage-shaped berley was affected by its density and the texture of its surface. The higher the density of the sausage-shaped berley the slower the release rate.

The sausage-shaped berley was then tested by placing it in Sarlon net bags and locating it in estuaries at Port Stephens, Forster and Lake Macquarie. Performance of the berley was examined by direct underwater observation. The berley sausages were equally effective at each location. Typical species attracted by the berley at the above locations included hardiheads, whitebait, mullet, bream, blackfish, flathead, tailer, schnapper, trevally, sweep, garfish, pike, leatherjacket and wrasses, including blue groper. At sea, off Port Stephens and off Clovelly in Sydney the berley attracted all the above and in addition mulloway, dolphin fish and kingfish. It is not clear from these observations whether the larger predator species are attracted directly by the berley particles or by the aggregation of smaller bait fish which aggregate in the vicinity of the berley. Autopsies of larger predator species including kingfish and large schnapper reveal significant quantities of berley components in their stomachs. However further experimental observations are required to ascertain whether or not these fish are attracted by berley particles per se or by a combination of berley particles and the presence of bait fish or by the aggregations of bait fish alone.

EXAMPLE 2

Sausage-shaped berley was manufactured according to Example 1 having the following composition and has been observed to be suitable berley for crab and craypots:
40–45% Fine cereal brans
24% Cereal flours
21% Brine solution
4.7% Dried fish waste solids (80% passing through a 750 micron sieve)
5.3–10.3% Fish oils.
(%—by weight)

The diameter of typical sausage-shaped berley of Examples 1 and 2 is from 20 to 150 mm and the length of the sausage-shaped berley can be from 30 to 500 mm.

The typical in situ life of sausage-shaped berley according to Examples 1 and 2 is four hours. This sausage-shaped berley does not require refrigeration and has a typical shelf life of between 8 and 12 weeks (when not subjected to extreme conditions).

EXAMPLE 3

A berley composition was prepared consisting of:
28.4% Coarse wheat bran (95%+>2 mm)
28.4% Fine wheat bran (−1 mm+11 μm)
17.5% High protein wheat flour (13.3% to 14% total protein calculated at 13% moisture level).
16.1% Brine Solution (5.1% Total alkalis)
6.0% Dried fish waste solids (80% passing through a 750 micron sieve; supplier Edgell Pty Ltd, Eden NSW, Australia—Edgell Green Seas (Trade Mark).
3.6% Tuna oil
(%—by weight)

The tuna oil was mixed with the coarse and fine wheat brans. The other ingredients were then added in the above proportions. After mixing sausage-shaped berley 20–150 mm in diameter, 30–500 mm in length was manufactured by pressure moulding using teflon or ultra-high density, polyethylene coated moulds.

The sausage was dried to lower the moisture content to equal or slightly less than about 20% by weight. The sausage shaped berley was then packed in a thick polyethylene bag having a tropical M.V.T.R. rating of less than 6 $gm^{-2}$ $day^{-1}$ moisture transfer under a gradient of 95% R.H. at 25° C. Paraformaldehyde pellets were added to the plastic bag just prior to sealing at 1.5–2.0 g of paraformaldeyde per kilogram of berley.

Berley prepared and packed as above was found to have no mould formation for at least six weeks after packing even after it had been subject to a degree of heating (e.g. from exposure to sunlight) sufficient to cause the berley to sweat within the polyethylene bag.

At additions of paraformaldehyde and or the equivalent formalin solution at the rate of 2 g of available formaldehyde per kilogram of sausage, no adverse reaction was noted during feeding by the following species to the berley sausage when compared with the control unheated sausage:

Salmo Sp; Girella Sp; Mylio Sp; Plectroplites Ambiguous; Platycephalus Sp; Achoerodus Gouldlii, Seriola Lalandi; Peneumatophorus Australascius; Mugil Sp; Arripis Georgianus; Chrysophyrs Auratus; Pomatomus Saltatrix; Scorpis Lineolatus; Trachurus Novaezelandiae; Meuschenia Trachylepis; Cheilodactylus Fuscus; Scomberomorous Cavalla; Hyporhamphus sp.; and Caranx Georgianus.

EXAMPLE 4

A berley composition was prepared consisting of:
31.2% Coarse wheat bran (95%+>2 mm)
31.2% Fine wheat bran (−1 mm+11 μm)
12.0% High protein wheat flour (13.3% to 14% total protein calculated at 13% moisture level).
16.0% Brine Solution 5.0% Total alkalis)
6.0% Dried fish waste solids (80% passing through a 750 micron sieve; supplier Edgell Pty Ltd, Eden NSW, Australia—Edgell Green Seas (Trade Mark).
3.6% Tuna oil
(%—by weight)

The tuna oil was mixed with the coarse and fine wheat brans. The other ingredients were then added in the above proportions. After mixing sausage-shaped berley 20–150 mm in diameter, 30–500 mm in length was manufactured by pressure moulding using teflon or ultra-high density, polyethylene coated moulds.

The sausage was dried to lower the moisture content to equal or slightly less than about 20% by weight. The sausage shaped berley was then packed in a thick polyethylene bag having a tropical M.V.T.R. rating of less than 6 $gm^{-2}$ $day^{-1}$ moisture transfer under a gradient of 95% R.H. at 25° C. Paraformaldehyde pellets were added to the plastic bag just prior to sealing at 1.5–2.0 g of paraformaldehyde per kilogram of berley.

Berley prepared and packed as above was found to have no mould formation for at least six weeks after packing even after it had been subject to a degree of heating (e.g. from exposure to sunlight) sufficient to cause the berley to sweat within the polyethylene bag.

At additions of paraformaldehyde and or the equivalent formalin solution at the rate of 2 g of available formaldehyde per kilogram of sausage, no adverse reaction was noted during feeding by the following species to the berley sausage when compared with the control unheated sausage:

Salmo Sp; Girella Sp; Mylio Sp; Plectroplites Ambiguous; Platycephalus Sp; Achoerodus Gouldlii, Seriola Lalandi; Peneumatophorus Australascius; Mugil Sp; Arripis Georgianus; Chrysophrys Auratus; Pomatomus Saltatrix; Scorpis Lineolatus; Trachurus Novaezelandiae; Meuschenia Trachylepis; Cheilodactylus Fuscus; Scomberomorous Cavalla; Hyporhamphus sp.; and Caranx Georgianus.

What I claim is:

1. A slow release berley composition comprising a mixture of from about 10% to about 35% by weight flour, from about 1.0% to about 20% by weight extracted fish oil, from about 30% to about 70% by weight bran, from about 5% to about 40% by weight water and from a trace to about 14% by weight of one or more water soluble alkali metal or alkaline earth metal salts or combinations thereof.

2. The composition as defined in claim 1 further including from a trace to about 20% by weight fish solids with at least about 80% by weight solids passing through a 2.83 mm screen.

3. The composition as defined in claim 1 wherein said flour is selected from wheat, rye, corn, rice, millet, sorghum, maize, barley or oat flour, or any mixture thereof.

4. The composition as defined in claim 1 wherein said bran is selected from wheat, rye, corn, rice, millet, sorghum, maize, barley or oat bran or any mixture thereof.

5. The composition as defined in claim 1 wherein said water is present in an amount of from about 15% to about 25% by weight.

6. The composition as defined in claim 1 wherein said salt is sodium chloride which is present in an amount of from about 5% to about 14% by weight.

7. The composition as defined in claim 1 wherein said flour is high protein flour which is present in an amount of from about 10% to about 25% by weight (about 10–16% by weight protein at about 10–14% by weight moisture level).

8. The composition as defined in claim 1 wherein said bran is wheat bran which is present in an amount of from about 38% to about 65% by weight.

9. The composition as defined in claim 2 comprising from a trace to about 11% by weight fish solids which have been dried to less than about 12% by weight water and wherein at least about 80% by weight of said fish solids pass through a 750 micron screen.

10. The composition as defined in claim 1 wherein said fish oil is selected from the group consisting of tuna oil, pilchard oil, whale oil, seal oil and mixtures thereof.

11. The composition as defined in claim 1 wherein said fish oil is pilchard oil.

12. The composition as defined in claim 1 wherein said fish oil is tuna oil or pilchard oil or a mixture thereof which is present in an amount of from about 2% to about 15% by weight.

13. The composition as defined in claim 2 comprising from about 2% to about 5% by weight tuna oil or pilchard oil or a mixture thereof.

14. A compressed mass in the form of a selected shape of the composition of claim 1.

15. A combination of said compressed mass as defined in claim 14 and a water-permeable container in which said mass is disposed.

16. The combination as defined in claim 15 wherein said water-permeable container is a Sarlon netting bag or an extruded plastic or polyethylene net bag.

17. A combination package comprising the combination as defined in claim 15 disposed in a non porous container.

18. The package as defined in claim 17 wherein said non porous container is a thick polyethylene bag having a tropical moisture vapour transfer rate rating of less than about 6 gm$^{-2}$ day$^{-1}$ moisture transfer under a gradient of 95% R.H. at 25° C.

19. The package as defined in claim 17 or claim 18 further including an antifungal agent, antibacterial agent, fumigant or any mixture thereof disposed in said non porous container.

20. The package as defined in claim 19 wherein said fumigant is paraformaldehyde.

21. A slow release berley composition comprising a mixture of about 17.5% by weight high protein wheat flour (about 12% to about 14% total protein at about a 13% moisture level), about 28.4% by weight coarse wheat bran (about 95% by weight greater than 2 mm), about 28.4% by weight fine wheat bran ($-1$ mm$+11$ μm), about 16.1% by weight aqueous sodium chloride solution (about 5.1% total alkali) about 6% by weight dried fish waste solids (80% by weight passing through a 750 micron sieve) and about 3.6% by weight extracted fish oil.

22. A slow release berley composition as defined in claim 21 wherein said fish oil is tuna oil or pilchard oil or a mixture thereof.

23. A slow release berley composition comprising a mixture of about 12.0% by weight high protein wheat flour (about 12% to about 14% total protein at about a 13% moisture level), about 31.2% by weight coarse wheat bran (about 95% by weight greater than 2 mm), about 31.2% by weight fine wheat bran ($-1$ mm$+11$ μm), about 16.0% by weight aqueous sodium chloride solution (about 5.0% total alkali) about 6% by weight dried fish waste solids (80% by weight passing through a 750 micron sieve) and about 3.6% by weight extracted fish oil.

24. A slow release berley composition as defined in claim 23 wherein said fish oil is tuna oil or pilchard oil or a mixture thereof.

25. A process for preparing a slow release berley composition comprising a mixture of from about 10% to about 35% by weight flour from about 1.0% to about 70% by weight bran, from about 5% to about 40% by weight water, from a trace to about 14% by weight of one or more water soluble alkali metal or alkaline earth metal salts or combinations thereof and from about 1.0% to about 20% by weight extracted fish oil which process comprises a first step of forming a bran/fish oil mixture by mixing said bran with said fish oil and a second step of mixing said flour, said water and said alkali metal or alkaline earth metal salt or combinations thereof with said bran/fish oil mixture to form said composition.

26. The process as defined in claim 25 wherein said composition further includes from a trace to about 20% by weight fish waste solids with at least about 80% by weight passing through a 2.83 mm screen and said second step further comprises mixing said fish waste solids with said bran/fish oil mixture to form said composition.

27. The process as defined in claim 25 wherein said flour is selected from wheat, rye, corn, rice, millet, sorghum, maize, barley or oat flour, or any mixture thereof.

28. The process as defined in claim 25 wherein said bran is selected from wheat, rye, corn, rice, millet, sorghum, maize, barley or oat bran or any mixture thereof.

29. The process as defined in claim 25 wherein said water is present in an amount of from about 15% to about 25% by weight.

30. The process as defined in claim 25 wherein said salt is sodium chloride which is present in an amount of from about 3% to about 14% by weight.

31. The process as defined in claim 25 wherein said flour is high protein flour which is present in an amount of from about 10% to about 25% by weight (about 10-16% by weight protein at about 10-14% by weight moisture level).

32. The process as defined in claim 25 wherein said bran is wheat bran which is present in an amount of from about 38% to about 65% by weight.

33. The process as defined in claim 26 wherein said fish solids are present in an amount from a trace to about 11% by weight and wherein said fish solids have been dried to less than about 12% by weight water and at least about 80% by weight of said fish solids pass through a 750 micron screen.

34. The process as defined in claim 25 wherein said fish oil is selected from the group consisting of tuna oil, pilchard oil, whale oil, seal oil and mixtures thereof.

35. The process as defined in claim 25 wherein said fish oil is pilchard oil.

36. The process as defined in claim 25 wherein said fish oil is tuna oil or pilchard oil or a mixture thereof which is present in an amount of from about 2% to about 5% by weight.

37. The process as defined in claim 25 further including a third step of compressing said composition to form a selected shape.

38. The process as defined in claim 37 further comprising a fourth step of drying said shape to reduce the total water content of said mass to about 15% to about 24% by weight.

39. A method of attracting fish comprising placing an effective fish attracting amount of said composition as defined in claim 1 in a body of water having fish.

40. A method of attracting fish comprising placing an effective fish attracting amount of said mass as defined in claim 14 in a body of water having fish.

41. A method of attracting fish comprising placing an effective fish attracting amount of said combination as defined in claim 14 in a body of water having fish.

42. A method of attracting fish comprising placing an effective fish attracting amount of said combination as defined in claim 15 in a body of water having fish.

43. A slow release berley composition when prepared according to the process as defined in claim 25.

* * * * *